US008448241B1

(12) United States Patent
Kadakia (10) Patent No.: US 8,448,241 B1
(45) Date of Patent: May 21, 2013

(54) BROWSER EXTENSION FOR CHECKING WEBSITE SUSCEPTIBILITY TO CROSS SITE SCRIPTING

(75) Inventor: Nirave D. Kadakia, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1428 days.

(21) Appl. No.: 11/357,805

(22) Filed: Feb. 16, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .................................. 726/22; 726/23; 726/25

(58) Field of Classification Search
USPC ............................................... 726/22, 23, 25
See application file for complete search history.

(56) References Cited

U.S. PATENT DOCUMENTS

| | | | | |
|---|---|---|---|---|
| 6,611,925 | B1* | 8/2003 | Spear | 714/38.14 |
| 7,343,626 | B1* | 3/2008 | Gallagher | 726/25 |
| 2002/0010855 | A1* | 1/2002 | Reshef et al. | 713/164 |
| 2003/0159063 | A1* | 8/2003 | Apfelbaum et al. | 713/200 |
| 2006/0253582 | A1* | 11/2006 | Dixon et al. | 709/225 |
| 2006/0276997 | A1* | 12/2006 | Drees | 702/182 |
| 2007/0061734 | A1* | 3/2007 | Abdulhayoglu | 715/742 |
| 2007/0079361 | A1* | 4/2007 | Hays et al. | 726/5 |
| 2007/0136806 | A1* | 6/2007 | Berman | 726/22 |
| 2008/0172382 | A1* | 7/2008 | Prettejohn | 707/6 |

OTHER PUBLICATIONS

Paul Lee, Cross-site scripting, Sep. 1, 2002, IBM Global Services.*
Amit Klein, Cross Site Scripting Explained, Jun. 2002, Sanctum Inc.*
Anand Sharma, Prevent a Cross-site Scripting Attacks, Feb. 4, 2002.*

* cited by examiner

*Primary Examiner* — Edan Orgad
*Assistant Examiner* — Jahangir Kabir
(74) *Attorney, Agent, or Firm* — Martine Penilla Group, LLP (57) ABSTRACT

A system for testing the susceptibility of an Internet website to process cross-site scripting instructions is disclosed. The system includes an Internet web browser, a web server and an extension module embedded within the Internet web browser. The extension module is made up of two distinct components, a sending component and a receiving component. Within the sending component, is a translator object coupled to a first reference source. Within the receiving component is an interceptor object coupled to a second reference source. Together, the sending component and receiving component are used to communicate cross-site scripting test commands and receive responses from the web server hosting the Internet website being targeted for testing.

17 Claims, 6 Drawing Sheets

| XSS Attack Tag Name | Script |
|---|---|
| 308 — C1 (Pop-Up Window) | \<Script\> ... [Create New Window] |
| 310 — C2 (Website Re-direct) | \<script\> ... [Re-direct User to designated website] |
| 312 — C3 (Long String Insertion) | \<script\> ... ......Long Character String with Tag] |
| 314 — C4 (Scripted Function) | \<script\> ... [Specified Function] |

| Question | XSS Attack Tag Name | Warning Message |
|---|---|---|
| 402 — Window PoP uP? | C1 | "Pop ups" |
| 404 — Re-direct? | C2 | "Bad Re-direct" |
| 406 — String "Tag"? | C3 | "Too Many Characters" |
| 408 — <Scripted Function>?? | C4 | "Bad Function" |

BROWSER EXTENSION FOR CHECKING WEBSITE SUSCEPTIBILITY TO CROSS SITE SCRIPTING

BACKGROUND

Websites today are becoming more complex than ever through the introduction of a wide variety of dynamic content designed to enrich the overall Internet experience for users. Dynamic content is achieved through the use of web applications that can custom tailor a website to the user depending on their individual settings and preferences. However, a downside to dynamic content embedded websites is that they expose users to one particular type of security threat that "static" websites do not, cross-site scripting (XSS). XSS attacks focus on the way HTML content is generated and interpreted by a user's browser. It is a common and severe security problem that occurs when a malicious attacker inserts malicious code to a website, in the form of JavaScript, VBScript, ActiveX, HTML or Flash, for execution on user systems. A user may unwittingly activate malicious code embedded in a webpage simply by clicking on a link on the website, opening an e-mail/e-mail attachment or reading an online journal (blog)/message board/guestbook posting. Once activated, this malicious code can do everything from hijacking user accounts, changing user settings, collecting user personal information and stealing user cookies to re-directing users to a malicious server of the attacker's choice.

A number of conventional methods and tools are available for web users to combat XSS attacks. The most simple preventative actions that a user can institute is completely disable scripting languages in their web browser and e-mail client and follow only links from a main website for viewing. The disadvantages with the above approaches are that the user suffers a significant curtailment of the amount of content that he can view and experience on the Internet. Alternatively, the user can use a browser emulating tool to check a website's vulnerability to malicious code implantation before he actually visits the site using his browser. These tools have two main drawbacks: 1. conventional XSS testing tools require the user to know how to create the script that emulates the XSS attacks, and 2. conventional XSS tools cannot be run during the normal course of browsing. In short, the current XSS testing tools require specialized training on the part of the tester and are therefore not user friendly.

In view of the forgoing, a user friendly tool is needed that checks for website susceptibility to cross-site scripting attacks without requiring the user to provide specialized information and that allows a user to initiate a checking operation during the normal course of browsing.

SUMMARY

Broadly speaking, the present invention fills these needs by providing a tool to check websites for vulnerability to XSS type attacks. It should be appreciated that the present invention can be implemented in numerous ways, including as a system, a method and a computer program. Several inventive embodiments of the present invention are described below.

In one embodiment, a method for testing the susceptibility of an Internet website to process cross-site scripting instructions using a single web browser is disclosed. From within a web browser, a user first identifies a cross-site scripting attack type from a browser extension that is operatively coupled to the web browser. The browser extension then generates a script code associated with the identified cross-site scripting attack type and sends the script code to the web server hosting the target Internet website. Next, the user uses the web browser to communicate with the Internet website to elicit a response from the web server hosting the Internet website. The response is parsed and examined by the extension to see if the cross-site scripting attack was successful against the Internet website.

In another embodiment, a method for testing the susceptibility of an Internet website to process cross-site scripting instructions using two separate web browsers is disclosed. From within a first web browser, the user identifies a cross-site scripting attack type from a browser extension that is operatively coupled to the first web browser. The browser extension then generates a script code associated with the identified cross-site scripting attack type and sends the script code to the web server hosting the targeted Internet website. From within a second web browser, the user communicates with the Internet website to elicit a response from the web server hosting the Internet website. The response is parsed and examined by the extension to see if the cross-site scripting attack was successful against the Internet website.

In still another embodiment, a system for testing the susceptibility of an Internet website to process cross-site scripting instructions is disclosed. The system includes an Internet web browser, a web server and an extension module embedded within the Internet web browser. The extension module is made up of two distinct components, a sending component and a receiving component. Within the sending component, is a translator object coupled to a first reference source. Within the receiving component is an interceptor object coupled to a second reference source. Together, the sending component and receiving component are used to communicate cross-site scripting test commands and receive responses from the web server hosting the Internet website being targeted for testing.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for methods and systems for checking websites for susceptibility to cross-site scripting attacks. It will be obvious, however, to one skilled in the art, that the present invention may be practiced without some or all of these specific details. In other instances, well known process operations have not been described in detail in order not to unnecessarily obscure the present invention.

The World Wide Web (WWW) uses a hypermedia-based system for enabling the browsing of Internet sites. As its name implies, the WWW is made of many websites linked together allowing users to travel from one website to another simply by clicking on hyperlinks. To access the web, a user typically runs a web browser program (e.g., Firefox™, Netscape™, etc.) that assists the user in navigating from amongst the various websites on the WWW and renders the web pages associated with those websites for viewing by the user. The functionality of a web browser program can be enhanced by adding a specialized embedded program, which for example purposes is called a browser extension. The browser extension can be integrated with the web browser code or can be separate but interfaced with the web browser code. What is disclosed by the embodiments described herein is essentially a browser extension that can be utilized by Internet users to test websites to determine their susceptibility to cross-site scripting (XSS) attacks.

Figure 1:
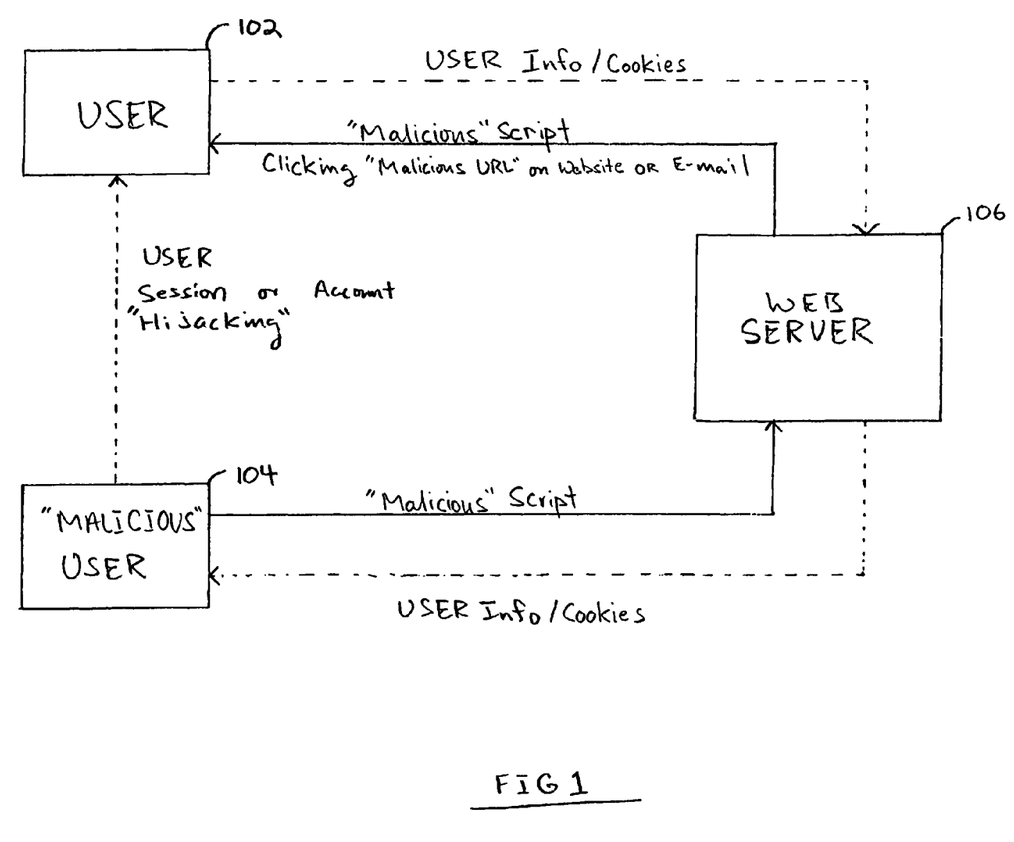
FIG. 1 depicts the common XSS attack scenarios encountered by Internet users.

FIG. 1 depicts the common XSS attack scenarios encountered by Internet users. In one exemplary XSS attack scenario, a malicious user 104 makes a post to a message board or user forum on a website hosted by the web server 106. Implanted within the post is a piece of malicious script code that can be executed by the user's 102 web browser. The malicious script code can be custom tailored by the malicious user 104 to effectuate various types of XSS attacks such as re-directing the user 102 to another website of the malicious user's choice, effectuating changes in the user's system settings or stealing user cookies. For the purposes of this application, a malicious script code is any program or string that can be used to adversely impact an Internet user during navigation and/or viewing of Internet websites. One skilled in the art will appreciate that a piece of malicious script code can be written using a number of different programming languages, the most common of which are JavaScript™, VBScript™, ActiveX™, or Flash™.

In another XSS attack scenario, the malicious user 104 first identifies a website (i.e., http://www.abc123.com) that requires the user to authenticate identity (i.e., a user account with an online vendor) and that tracks the authenticated user through use of a cookie or session identification (session ID). The malicious user 104 creates a malicious Universal Resource Locator (URL) link to a XSS vulnerable web page (i.e., http://www.abc123.com/vulnerable/) on the website by appending a piece of malicious script code, designed to steal a user's 102 cookie or session ID, to the URL of the XSS vulnerable web page (i.e., http://www.abc123.com/vulnerable/<script>malicious script code </script>). The malicious URL link is embedded within a Hypertext Markup Language (HTML) e-mail that the malicious user 104 sends to a list of potential users of the website. If any one of those users 102 clicks on the malicious URL link embedded within the e-mail, that user's 102 web browser will make a web page request to the web server 106 using the malicious URL link. Typically, an unprotected web server 106 will return the requested web page back to the user's 102 web browser along with the malicious script code (i.e., /<script>malicious script code </script>). In general, this return makes it appear as if everything is normal to the user. If a user 102 is logged into the website at the time the malicious script code is executed, a copy of that user's 102 cookie or session ID will automatically be relayed back to the malicious user 104. The malicious user 104 can then use the cookie or session ID to hijack the user 102 account on the website.

Figure 2:
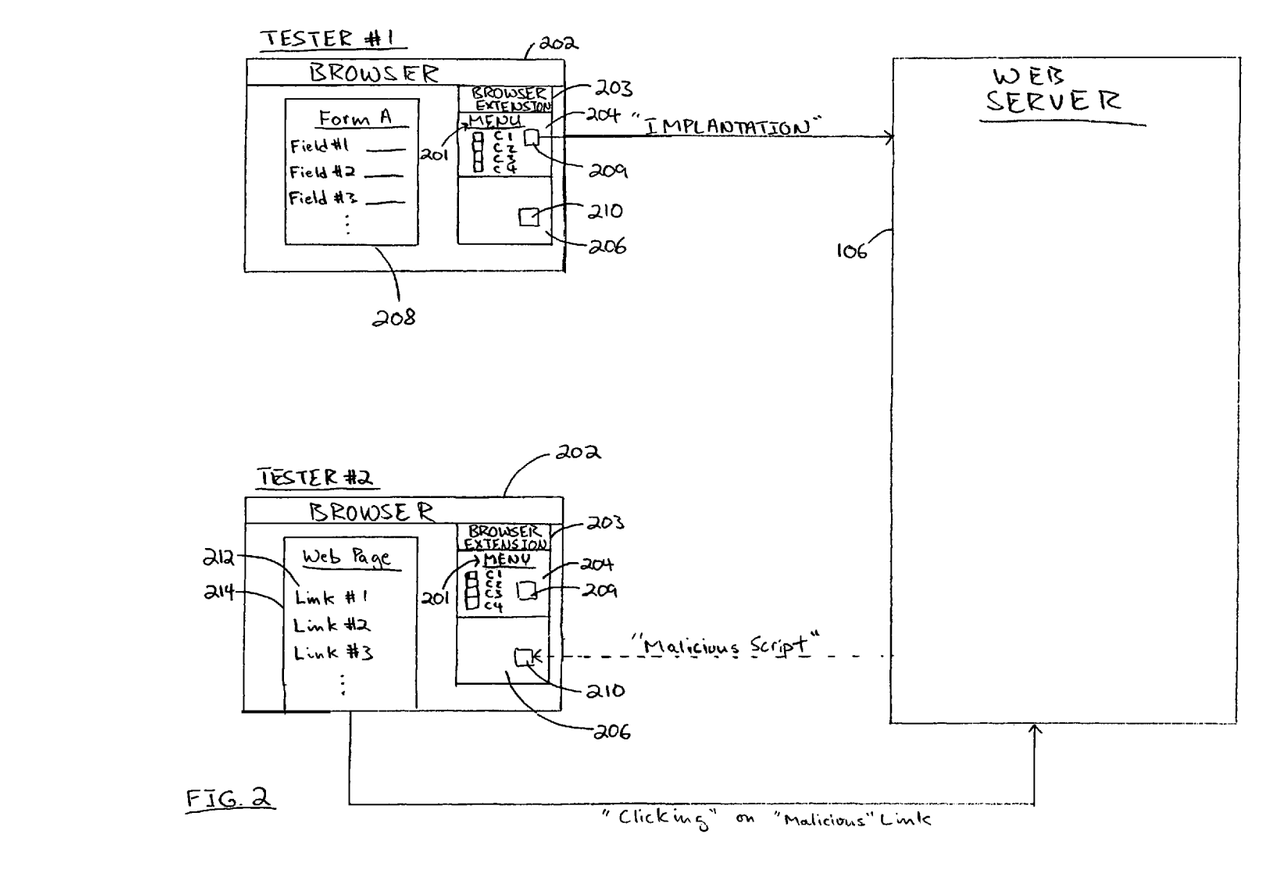
FIG. 2 is an illustration showing a system for testing the vulnerability of a website to a XSS type attack, in accordance with one embodiment of the present invention.

FIG. 2 is an illustration showing a system for testing the vulnerability of a website to a XSS type attack, in accordance with one embodiment of the present invention. In this exemplary embodiment, the system 200 includes two testing units (i.e., TESTER #1 and TESTER #2), each running its own separate web browser 202 program coupled to a browser extension 203 configured to test websites for vulnerability to XSS attacks. In one embodiment, the browser extension 203 is seamlessly integrated into the web browser 202 such that it does not interfere or interrupt normal web browser 202 activity. Any commercial or non-commercial web browser 202 that can interface with a browser extension 203 or plug-in can be utilized in this system 200. Some examples of browsers that can be used include Firefox™, Netscape™, and Internet Explorer™. Furthermore, it should be appreciated that the browser extension 203 can be created using any programming language as long as it satisfies the functional requirements of the browser extension 203 and the web browser 202. Examples of programming languages that can be used alone or in combination to create the browser extension 203 for the system 200 includes Java™, C, C++, Visual Basic, Practical Extraction and Reporting Language (PERL), Extensible Markup Language (XML), XML User Interface Language (XUL), HTML, Extensible Hypertext Markup Language (XHTML), and Extensible Bindings Language (XBL).

As illustrated, the browser extension 203 is provided as a graphical component (e.g., a GUI) on the web browser 202. However, it should be understood that the browser extension 203 can also be provided as a separate window that is distinct from the other features being rendered by the web browser 202, be completely transparent to the user, or be provided as a second browser that may be opened on the user's screen during the testing. In the example of two browsers, it would be required that the testing performed from one browser is capable of interfacing with the web browser 202 having the browser extension 203 so that the appropriate attack selection (i.e., for testing) is performed at TESTER #1.

Still on FIG. 2, in one embodiment, the browser extension 203 includes both a sending component 204 and a receiving component 206. The sending component 204 includes a translator object 209 that can be utilized to send a piece of malicious script code to a website during communications with the web server 106. The receiving component 206 includes an interceptor object 210 that traps all incoming communications from the web server 106 to the web browser 202. In an alternative embodiment, the browser extension 203 includes either a sending component 204 or a receiving component 206 but not both.

Continuing with FIG. 2, in one exemplary embodiment, a menu 201 is rendered on the web browser 202 by the browser extension 203 with a listing of menu tag names for various types of XSS attacks. The menu 201 provides a user interface for the tester, so that the tester can select which types of XSS attacks are desired for testing. Thus, one or more types of XSS attacks can be selected if the tester selects C1 and C2, C2 and C3, C1 and C4, or any combination thereof. It should be understood that C1-C4 are provided as examples to illustrate the selection process that is provided to the tester by the browser extension 203.

In one embodiment, when new types of XSS attacks are desired to be tested or if old XSS attack types need to be removed, the data structure that populates the menu 201 is updated, thus the menu 201 only displays the most recent list of tag names for XSS type attacks that would be useful in a given testing operation. In one embodiment, the updates to the XSS attack definitions on the menu 201 are done through an Internet connection to a XSS attack resources website. An update can occur automatically during regular periodic intervals or it can be a one time update that is purchased by a user from a XSS attack resources website.

In one embodiment, the user can manually input or delete XSS attack types on the menu 201 using a GUI interface that is rendered on the web browser 202 by the browser extension 203. In one embodiment, the menu 201 includes XSS attack tags for website re-directs, creation of window pop-ups, insertion of very large strings, and a specified function forwarding user cookies to a malicious user. However, it should be appreciated that any type of XSS attack can be programmed into the menu 201 so long as the malicious script code can operatively interface with the browser extension 203. Examples of XSS attacks that can be programmed into the menu 201 include, without limitation, changing of user settings, cookie theft, and false advertising. In one embodiment, there is no menu 201 rendered on the web browser 202, instead the browser extension 203 operates transparent to the user by automatically converting a XSS attack tag name (i.e., C1) into its corresponding malicious script code (i.e., <script>malicious script for C1</script>), whenever a user manually enters the tag name into a posting form 208 or other website input prompt (i.e., user login, etc.). For illustration, the posting form 208 has fields, such as fields #1, #2, #3, etc., among other text, icons, or graphics.

In one exemplary embodiment, when a user selects a XSS attack tag name on the menu 201, the sending component 204 of the browser extension 203 automatically translates the XSS attack tag name (i.e., C1) into the actual malicious script code that effectuates an XSS attack (i.e., <script>malicious script for C1</script>) and inputs the script code into the various fields of a posting form 208 for posting to a website hosted by the web server 106. For example, when TESTER #1 wants to test the susceptibility of a blog website hosted by the web server 106 to a website re-direct XSS attack, TESTER #1 only needs to select a tag name representative of a website re-direct XSS attack (i.e., C1) from the menu 201. The translator object of the sending component 204 automatically translates the C1 tag into the appropriate malicious script code and inserts it into the website posting form 208. The automatic translation, in one embodiment, can simply include a look up in a database, mapping to a file, or the generation of malicious script code. When TESTER #1 submits the posting form 208 to the blog website, the sending component 204 communicates the posting form 208 impregnated with the malicious script code to the web server 106.

It should be appreciated that the posting form 208 is but one example of how a piece of malicious script code can be implanted into a website. In practice, the sending component 204 can implant malicious script code into a website through any communication operation between the web browser 202 and the website involving a submission of data to the website. In one embodiment, the browser extension 203 is configured to test a XSS attack type that does not involve the implantation of malicious script code to a website. In this XSS attack test, the tester selects the XSS attack tag corresponding to a malicious URL link type XSS attack whereby the sending component 204 sends a request to the web server 106 asking for the web page associated with the malicious URL link. The web server 106 will return the requested web page along with the malicious script back to the web browser 202. In general, this return makes it appear as if everything is normal to the user.

In one embodiment, TESTER#2 is used in tandem with TESTER#1 to determine whether TESTER #1 was successful in instituting a XSS type attack on websites hosted by web server 106. The web browser 202 for TESTER #2 includes a browser extension 203 identically configured to the one found in TESTER #1. The interceptor object 210 of the receiving component 206 traps all incoming communication from the web server 106. In one exemplary embodiment, the interceptor object 210 of the receiving component 206 can be used to determine if an incoming communication (e.g., web page) contains malicious script code capable of effectuating a XSS type attack. If the incoming communication is found to contain malicious script code for an XSS type attack, the receiving component 206 generates a text warning message to the web browser 202 that is indicative of the type of XSS attack (e.g., website re-direct) coded within the malicious script code.

It should be appreciated that a warning message can be delivered in other forms such as a text message in a pop-up window that is separate from the web browser 202, an audio-based warning (e.g., warning sound, recorded audio message, etc.), error log file, or an e-mail warning message to the user. Essentially any computer operation can act as a warning message to the user so long as the operation gets the attention of the user and the user is able to perceive the nature of the warning.

In one embodiment, a single tester unit is used in the system 200 instead of two (i.e., TESTER #1 and TESTER #2). The browser extension 203 coupled to the web browser 202 used by the single tester unit includes both a sending component 204 and a receiving component 206. The browser extension 203 is configured so that the sending component 204 can send out malicious script code to a web server 106 hosting a website and the receiving component 206 traps all incoming communications from the web server 106 for examination for malicious script code. In one embodiment, the browser extension 203 is configured so that it automatically tests a website for susceptibility to XSS types of attacks whenever a user accesses a new website using the web browser 202. The user does not have to initiate the testing after visiting a new website. Instead the new website cannot be viewed on the web browser 202 until the browser extension 203 has tested the new website for susceptibility to XSS type attacks. In one embodiment, the browser extension 203 can be configured so that the user can choose in advance which types of XSS attacks to test for.

Using the above example involving the website re-direct attack against a blog website, TESTER #2's web browser 202 and browser extension 203 can be used to check whether TESTER #1 was successful in implanting malicious script into the blog website. As depicted, the web browser 202 displays a web page 214 from the blog website listing the URL links 212 for various blog entries including the malicious URL link 212 associated with the entry impregnated with malicious script code by TESTER #1. Upon selecting the malicious URL link 212 on the blog website, the web server 210 hosting blog website sends the web page 214 containing the malicious script code to the receiving component 206 of Tester #2. The receiving component 206 will trap the incoming web page, then parse and examine it for any malicious script code. If malicious script is found in the web page, the receiving component sends an appropriate warning text (i.e., "website re-direct") to be displayed in the web browser 202.

Figure 3A:
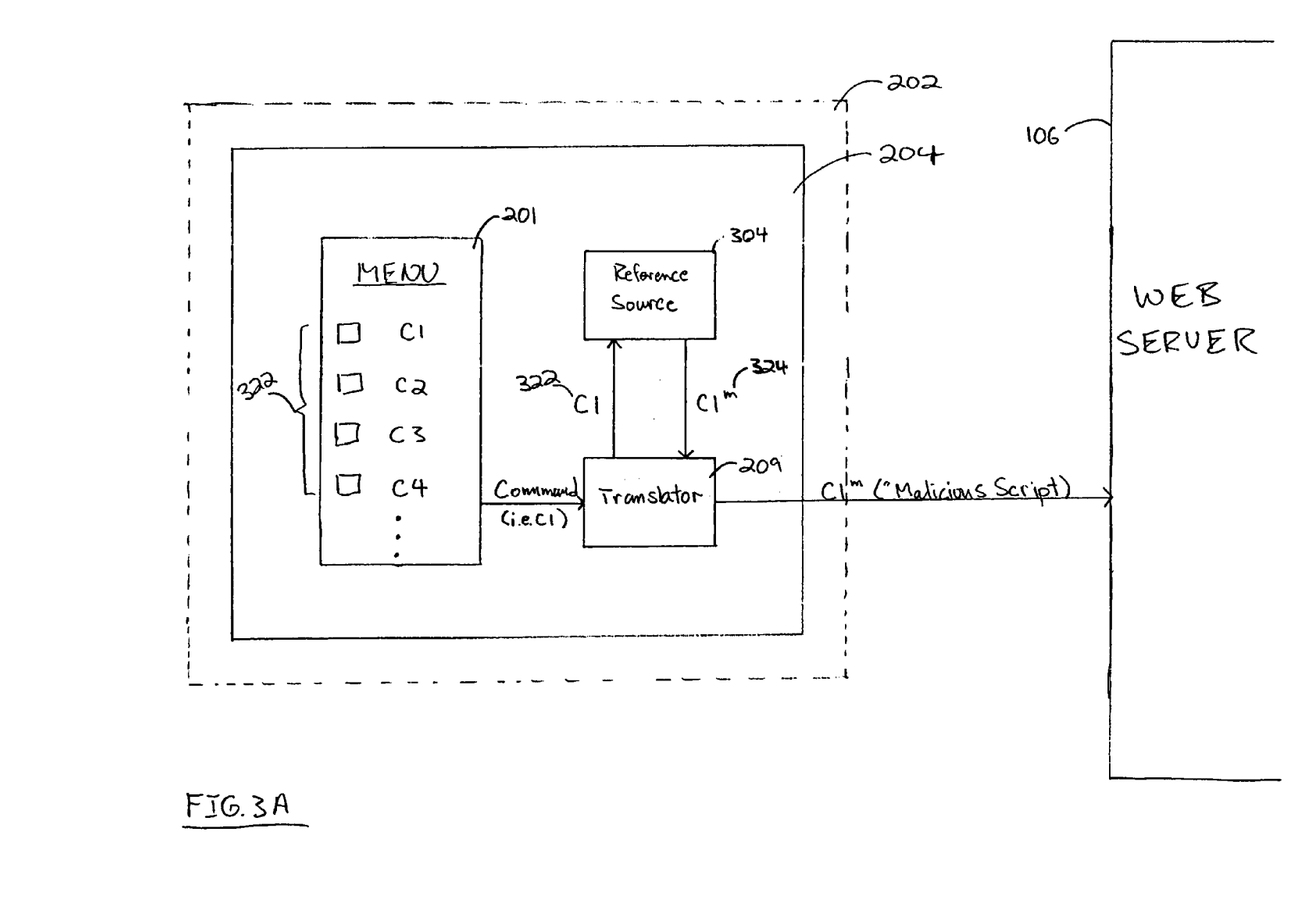
FIG. 3A shows a detailed illustration of the functional elements of the sending component of the browser extension, in accordance with one embodiment of the present invention.

FIG. 3A shows a detailed illustration of the functional elements of the sending component of the browser extension, in accordance with one embodiment of the present invention. In this exemplary embodiment, the sending component 204 includes a menu 201 that is operatively connected to a translator object 209 which is in turn coupled to both a malicious script definition reference source 304 and a web server 106. It should be appreciated that the translator object 209 is not exclusively coupled to just one web server 106. The translator object 209 can be coupled to different web servers 106 at any given time as the web browser 202 navigates from one website to another.

Continuing with FIG. 3A, the menu 201 contains a list of tag names 322 (i.e., C1, C2, C3, C4, etc.) each corresponding to a particular type of XSS attack. When a user chooses a tag name 322 (i.e., C1), that tag name 322 is sent to the translator object 209 which in turn communicates the tag name 322 to the malicious script definition reference source 304. The malicious script definition reference source 304 is configured to map each tag name input it receives to their respective malicious script code 324 (i.e., C1′″) and return that malicious script code 324 back to the translator object 209. The translator object 209 then relays that malicious script code 324 to the web server 106 by either inputting the script 324 into a posting form that is sent to a website hosted by the web server 106 or appending a URL link with the malicious script code 324 then sending the appended URL link as part of a web page request to the web server 106. In one embodiment, the malicious script definition reference source 304 is not an integrated part of the sending component 204 but is instead an independent file, hash table or database that is operatively coupled to the sending component 204. The reference source 304 may still reside on the same system as the web browser 202 resides in or be located in another system such as a server or an external storage device.

Figure 3B:
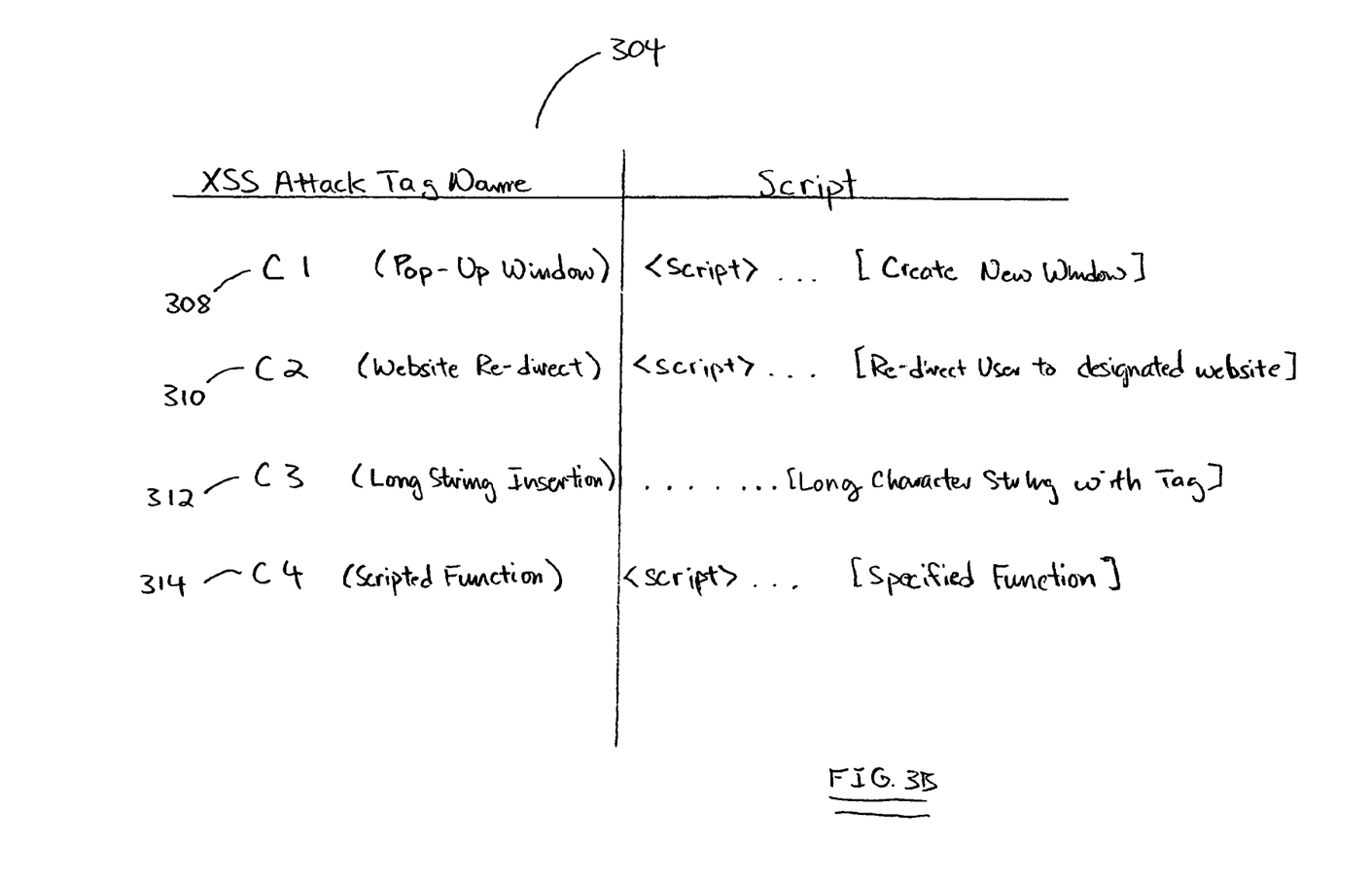
FIG. 3B illustrates the data construct of a malicious script definition reference source, in accordance with one embodiment of the present invention.

FIG. 3B illustrates the data construct of a malicious script definition file, in accordance with one embodiment of the present invention. In this exemplary embodiment, the malicious script definition reference source 304 includes a data table with two columns (i.e., XSS Attack Tag Name and Script). It should be understood that the malicious script definition reference source 304 data table can contain more or less columns and lines depending on the requirements of the particular application. The malicious script definition reference source 304 can be created using any data protocol as long as the reference source 304 can function with the translator object of the browser extension. Examples of acceptable data protocols include but are not limited to ASCII text, XML, and HTML. As shown herein, the XSS Attack Tag Name column calls out four different types of XSS attacks including pop-up window (C1) 308, website re-direct (C2) 310, long string insertion (C3) 312, and scripted function (C4) 314.

Each XSS Attack Tag Name is associated with a unique malicious script code under the Script column of the data table. It should be appreciated that the malicious script codes can be created using a number of different programming languages, the most common of which are JavaScript™, VBScript™, ActiveX™, or Flash™. However, basically any programming language will suffice so as long as the malicious script code can be executed by a user's web browser. The combination of a XSS Attack Tag Name with its respective script code constitutes one XSS attack entry in the malicious script definition reference source 304.

It should be understood that the malicious script definition reference source 304 can contain more than just the four XSS attack entries shown in FIG. 3B. The reference source 304 can contain as many or as few XSS attack entries as is necessary so long as the reference source 304 size does not exceed the memory storage capacity of the system that the reference source 304 resides in. In one embodiment, the malicious script definition reference source 304 is updated through an Internet connection to a XSS attack resources website. The updates can occur automatically according to regular periodic intervals or it can be through one time updates that are purchased from a XSS attack resources website. In one embodiment, the user can manually modify the XSS attack entries in the malicious script definition reference source 304 using a GUI interface that is rendered on a user's web browser or as a separate window by the browser extension.

Figure 4A:
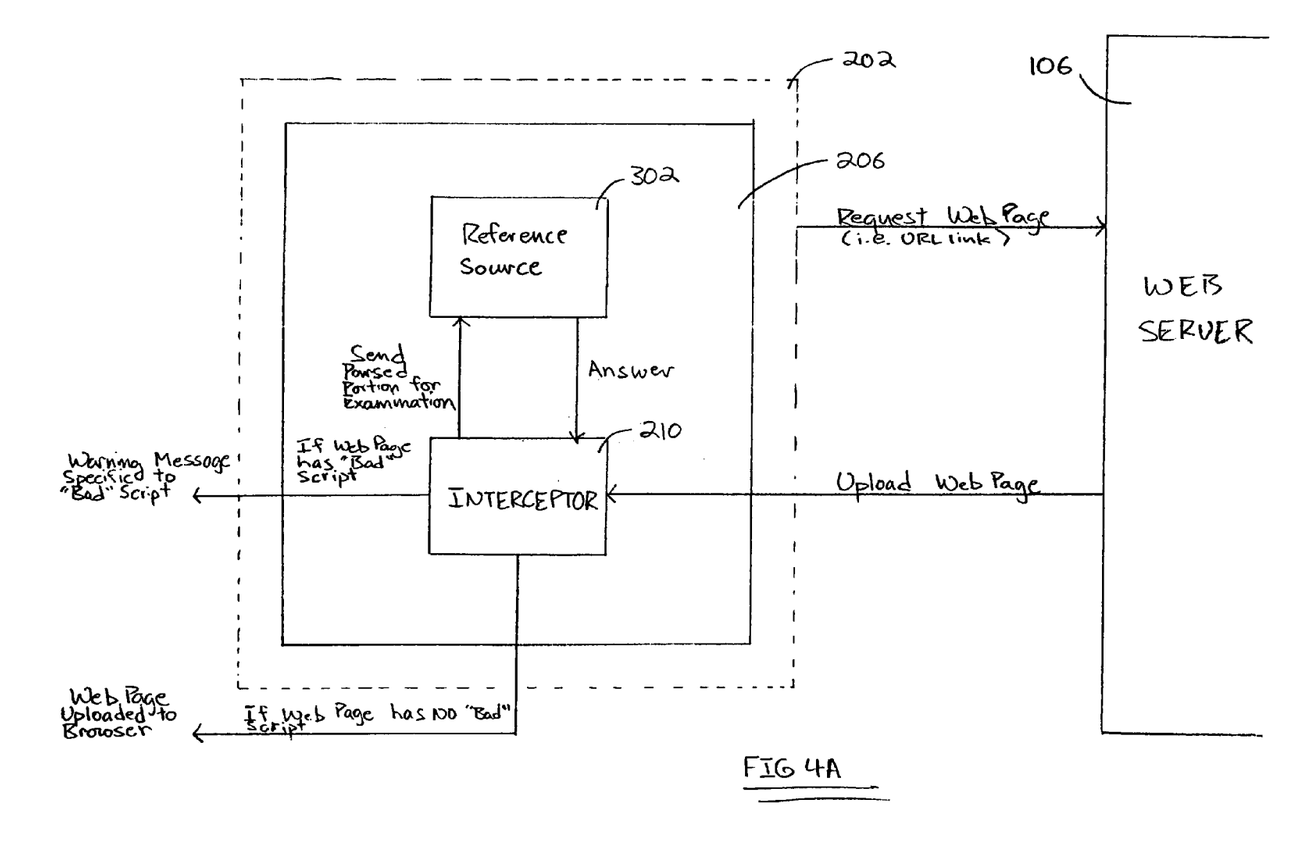
FIG. 4A shows a detailed illustration of the functional elements of the receiving component of the browser extension, in accordance with one embodiment of the present invention.

FIG. 4A shows a detailed illustration of the functional elements of the receiving component of the browser extension, in accordance with one embodiment of the present invention. In this exemplary embodiment, the receiving component 206 includes an interceptor object 210 that is coupled to a malicious script characterization reference source 302 and a web server 106. It should be appreciated that the interceptor object 210 is not exclusively coupled to just one web server, the interceptor object 210 can be coupled to a different web servers 106 as a user navigates the web browser 202 from one website to another.

Continuing with FIG. 4A, when a user clicks on a URL link on a website or embedded into an e-mail, the web browser 202 sends a request to the hosting web server 106 for the web page associated with the URL link. The web server 106 responds to the request with either the web page or a DNS error page which is trapped by the interceptor object 210, since the interceptor object 210 is configured to trap all incoming communications from the web server 106. The interceptor object 210 then parses and examines the content of the web page or DNS error page for embedded malicious XSS attack script code using the malicious script characterization reference source 302. The malicious script characterization reference source 302 is configured to examine each parsed portion of the page to determine if any parsed portion contains malicious XSS script code that can effectuate a malicious XSS type attack.

If no malicious XSS script code is discovered in the incoming web page or DNS error page, the interceptor object 210 allows the page to upload in the web browser 202 for viewing by the user. If malicious XSS script code is found to be embedded in the page, the malicious script characterization reference source 302 maps the malicious XSS type attack effectuated by the malicious XSS script code to an associated warning message. The interceptor object 210 then generates the warning message specific to the malicious XSS type attack effectuated by the malicious XSS script code. In one embodiment, the malicious script characterization reference source 302 is not an integrated part of the receiving component 206 but is instead an independent file, hash table, or database that is operatively coupled to the receiving component 206. The reference source 302 may still reside on the same system as the web browser 202 resides or be located in another system such as a server or an external storage device.

Figure 4B:
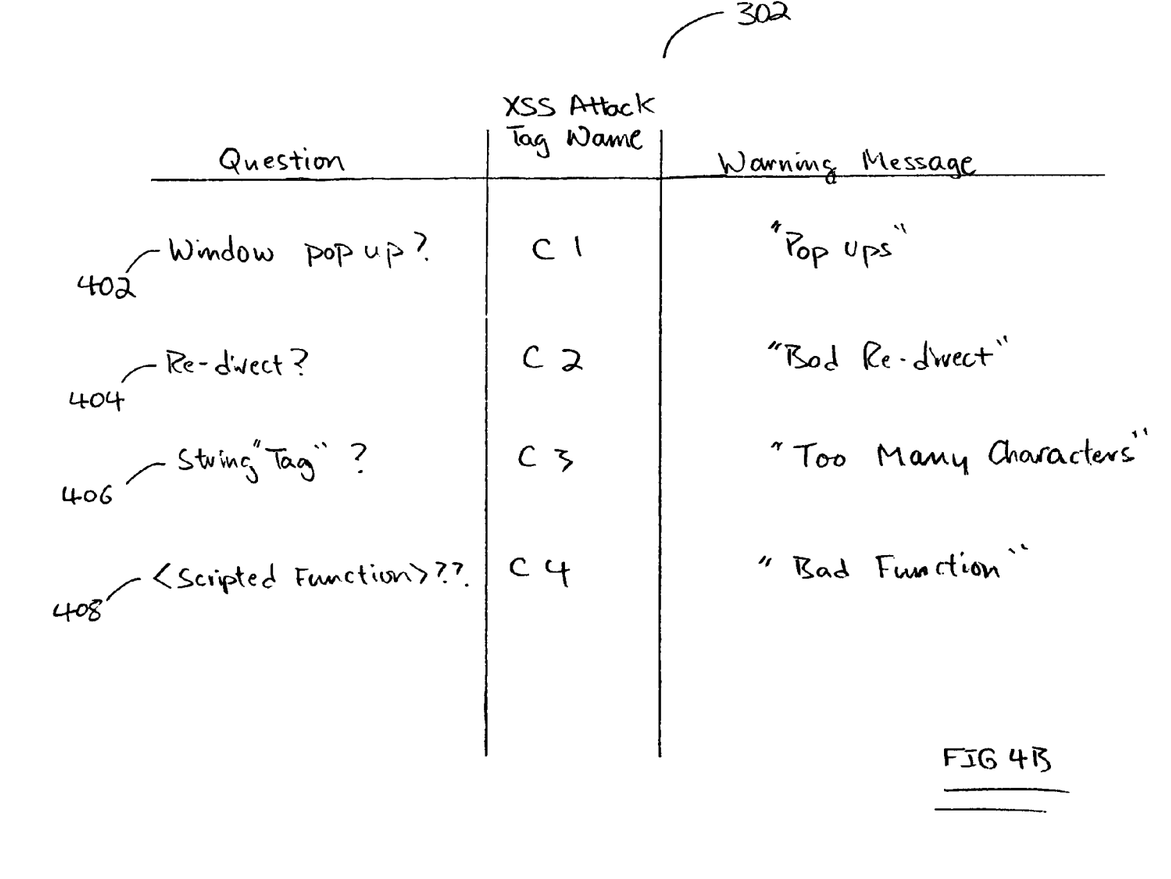
FIG. 4B illustrates the data construct of a malicious script characterization reference source, in accordance with one embodiment of the present invention.

FIG. 4B illustrates the data construct of a malicious script characterization reference source, in accordance with one embodiment of the present invention. In this exemplary embodiment, the malicious script characterization reference source 302 includes a data table with three columns (i.e., Question, XSS Attack Tag Name, and Warning Message). It should be understood that the malicious script characterization reference source 302 can contain more or less columns and lines depending on the requirements of the particular application. The malicious script characterization reference source 302 can be created using any data protocol as long as the file 302 can function with the interceptor object of the browser extension. Examples of acceptable data protocols include but are not limited to ASCII text, XML, and HTML.

As shown herein, the Query Question column calls out four separate XSS attack inquiries including "window pop-up" 402, "Re-direct" 404, "Large String" 406, and "Scripted Function" 408. Each Query Question is associated with a unique XSS Attack Tag Name which is in turn associated with a unique Warning Message. The combination of a Question, XSS Attack Tag Name, and Warning Message constitutes one XSS attack characterization entry in the malicious script characterization reference source 302. It should be understood that the malicious script characterization reference source 302 can contain more than just four XSS attack characterization entries as shown in FIG. 4B. The malicious script characterization reference source 302 can contain as many or as few XSS attack characterization entries as is necessary so long as the reference source 302 does not exceed the memory storage capacity of the system that the reference source 302 resides in. In one embodiment, the malicious script characterization reference source 302 is updated through an Internet connection to a XSS attack resources website. The updates can occur automatically according to regular periodic intervals or it can be through one time updates purchased from a XSS attack resources website. In one embodiment, the user can manually modify the XSS attack characterization entries in the malicious script characterization reference source 302 using a GUI interface that is rendered on a user's web browser or as a separate window by the browser extension.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A method for testing susceptibility of an Internet website to process cross-site scripting instructions, comprising:
   from within a browser, the browser being executed by a processor;
   receiving a cross-site scripting instruction at an extension interface of the browser, the cross-site scripting instruction being received from a website input prompt generated by the Internet website, the extension interface being integrated into the web browser so as to not interrupt normal web browser activity, the extension interface being configured to examine the cross-site scripting instruction and generate a corresponding script code;
   communicating with the Internet website through the browser, the communicating including transmitting the script code to the Internet website being executed by a web server, the script code being designed to cause a desired action on the part of the Internet website; and
   receiving a response from the web server in reply to the communication with the Internet website, the response being intercepted by the extension interface;
   wherein the extension interface parses and examines the response to determine if the desired action is performed by the Internet website;
   wherein the desired action being performed is indicative of a security breach on the Internet website.

2. The method for testing susceptibility of an Internet website to process cross-site scripting instructions, as recited in claim 1, wherein the desired action is a malicious action.

3. The method for testing susceptibility of an Internet website to process cross-site scripting instructions, as recited in claim 2, wherein the malicious action triggers execution of pre-determined activities by the Internet website.

4. The method for testing susceptibility of an Internet website to process cross-site scripting instructions, as recited in claim 3, wherein the pre-determined activities are one of pop-ups, re-directs, or function calls.

5. The method for testing susceptibility of an Internet website to process cross-site scripting instructions, as recited in claim 1, wherein the operation of the extension interface is transparent to a user of the browser.

6. The method for testing susceptibility of an Internet website to process cross-site scripting instructions, as recited in claim 1, wherein the extension interface does not permit the response to load in the web browser if the desired action is performed.

7. A method for testing susceptibility of an Internet website to process cross-site scripting instructions, comprising:
   from within a first browser, the first browser being executed by a processor;
   receiving a cross-site scripting instruction at a first extension interface of the browser, the cross-site scripting instruction being received from a website input prompt generated by the Internet website, the first extension interface being integrated into the first browser so as to not interrupt normal web browser activity, the first extension interface being configured to examine the cross-site scripting instruction and generate a corresponding script code;
   transmitting the script code to an Internet website being hosted by a web server, the script code being designed to cause a desired action on the part of the Internet website;
   from within a second browser, the second browser being executed by a processor;
   communicating with the Internet website through the second browser; and
   receiving a response from the web server in reply to the communication with the Internet website, the response being intercepted by a second extension interface of the second browser, the second extension interface being integrated into the second browser so as to not interrupt normal web browser activity;
   wherein the second extension interface parses and examines the response to determine if the desired action is performed by the Internet website;
   wherein the desired action being performed is indicative of a security breach on the Internet website.

8. The method for testing susceptibility of an Internet website to process cross-site scripting instructions, as recited in claim 7, wherein the communication with the Internet website through the second browser is initiated by selecting an URL link on the Internet website.

9. A system for testing cross-site scripting vulnerability of an Internet website comprising:
   an Internet web browser;
   a web server, the web server including at least one server computer; and
   an extension module embedded within the Internet web browser, the extension module being integrated into the web browser so as to not interrupt normal web browser activity, wherein the extension module is comprised of a sending component and a receiving component, the sending component including a translator object coupled to a first reference source, the receiving component including an interceptor object coupled to a second reference source, the sending component and the receiving component being used in communication with the web server, wherein,
   the translator object is configured to receive an instruction from a website input prompt generated by the Internet website, and in response to receiving the instruction, to utilize the first reference source to transmit a corresponding malicious script code to the Internet website, and the interceptor object is configured to parse a response from the web server into segmented portions that can be examined using the second reference source to determine if the response contains the malicious script code communicated by the translator object.

10. The system for testing cross-site scripting vulnerability of an Internet website, as recited in claim 9, wherein each of the first reference source and the second reference source is one of a mapping file, a hash table, or a database.

11. The system for testing cross-site scripting vulnerability of an Internet website, as recited in claim 9, wherein the interceptor object is configured to trap the response from the web server for processing before execution by the Internet web browser.

12. The system for testing cross-site scripting vulnerability of an Internet website, as recited in claim 9, wherein the interceptor object generates a warning message to the Internet web browser if the response is determined to contain the malicious script code.

13. The system for testing cross-site scripting vulnerability of an Internet website, as recited in claim 9, wherein the malicious script code is configured to effectuate the execution of pre-determined activities by the Internet website.

14. The system for testing cross-site scripting vulnerability of an Internet website, as recited in claim 13, wherein the pre-determined activities is one of pop-ups, redirects, or function calls.

15. The system for testing cross-site scripting vulnerability of an Internet website, as recited in claim 9, wherein the extension module renders a user interface on the Internet web browser.

16. The system for testing cross-site scripting vulnerability of an Internet website, as recited in claim 15, wherein the user interface is a graphical user interface (GUI).

17. The system for testing cross-site scripting vulnerability of an Internet website, as recited in claim 16, wherein the GUI includes a scrollable menu, the scrollable menu containing a list of cross-site scripting tags associated with corresponding malicious script codes, the GUI being configured so that the corresponding malicious script code is sent to the web-server whenever each cross-site scripting tag is selected.

\* \* \* \* \*